(12) United States Patent
Ettl

(10) Patent No.: US 12,081,000 B2
(45) Date of Patent: Sep. 3, 2024

(54) CABLE REEL FOR A HIGH-VOLTAGE CABLE

(71) Applicant: Siemens Energy Global GmbH & Co. KG, Munich (DE)

(72) Inventor: Christian Ettl, Weiz (AT)

(73) Assignee: Siemens Energy Global GmbH & Co. KG, Munich (DE)

( * ) Notice: Subject to any disclaimer, the term of this patent is extended or adjusted under 35 U.S.C. 154(b) by 1085 days.

(21) Appl. No.: 16/962,337

(22) PCT Filed: Dec. 18, 2018

(86) PCT No.: PCT/EP2018/085536
§ 371 (c)(1),
(2) Date: Jul. 15, 2020

(87) PCT Pub. No.: WO2019/137761
PCT Pub. Date: Jul. 18, 2019

(65) Prior Publication Data
US 2020/0343709 A1 Oct. 29, 2020

(30) Foreign Application Priority Data
Jan. 15, 2018 (DE) .............. 102018200587

(51) Int. Cl.
*H02G 11/02* (2006.01)
*B60P 3/035* (2006.01)
(Continued)

(52) U.S. Cl.
CPC .............. *H02G 11/02* (2013.01); *B60P 3/035* (2013.01); *B65H 49/327* (2013.01); *B65H 49/38* (2013.01);
(Continued)

(58) Field of Classification Search
CPC ......... H02G 11/02; B60P 3/035; B65H 49/38; B65H 49/327; B65H 54/44; B65H 75/4489; B65H 2701/34
See application file for complete search history.

(56) References Cited

U.S. PATENT DOCUMENTS 3,103,322 A 9/1963 Garner
3,458,152 A 7/1969 Barkley
(Continued)

FOREIGN PATENT DOCUMENTS

DE 1260580 B 2/1968
DE 202014001556 U1 4/2014
(Continued)

OTHER PUBLICATIONS

PCT International Search Report and Written Opinion of International Searching Authority mailed Apr. 4, 2019 corresponding to PCT International Application No. PCT/EP2018/085536 filed Dec. 18, 2018.

*Primary Examiner* — Sang K Kim
(74) *Attorney, Agent, or Firm* — Laurence A. Greenberg; Werner H. Stemer; Ralph E. Locher

(57) ABSTRACT

A cable holder for the long-term storage and the rapid transport of high-voltage cables, is storable for long periods with little outlay. The cable holder includes a rotatable cable reel which has a winding cylinder and side limits which are connected for conjoint rotation with the winding cylinder and protrude over the circumference of the winding cylinder. A holding frame is provided for rotatably mounting the cable reel. A high-voltage cable is wound onto the cable reel. The winding cylinder has a diameter of over 1300 mm.

8 Claims, 2 Drawing Sheets

(51) Int. Cl.
 *B65H 49/32* (2006.01)
 *B65H 49/38* (2006.01)
 *B65H 54/44* (2006.01)
 *B65H 75/44* (2006.01)

(52) U.S. Cl.
 CPC ......... *B65H 54/44* (2013.01); *B65H 75/4489* (2013.01); *B65H 2701/34* (2013.01)

(56) References Cited

U.S. PATENT DOCUMENTS

| | | |
|---|---|---|
| 4,945,938 A | 8/1990 | Ponsford |
| 5,887,815 A | 3/1999 | Pierce |
| 2012/0223179 A1* | 9/2012 | Galindo Gonzalez ....................... B65H 49/325 242/598.5 |
| 2017/0316860 A1 | 11/2017 | Ettl |
| 2017/0316862 A1 | 11/2017 | Ettl |
| 2017/0316864 A1 | 11/2017 | Ettl |
| 2017/0316876 A1 | 11/2017 | Ettl |
| 2018/0282109 A1 | 10/2018 | Colleoni |

FOREIGN PATENT DOCUMENTS

| | | |
|---|---|---|
| EP | 2804272 A1 | 11/2014 |
| KR | 100903964 B1 | 6/2009 |
| WO | WO 2017072226 A1 | 5/2017 |
| WO | WO 2017186716 A1 | 11/2017 |
| WO | WO 2017186748 A2 | 11/2017 |
| WO | WO 2017186749 A1 | 11/2017 |
| WO | WO 2017186751 A1 | 11/2017 |

* cited by examiner

CABLE REEL FOR A HIGH-VOLTAGE CABLE

BACKGROUND OF THE INVENTION

Field of the Invention

The invention relates to a cable holder for the long-term storage and the rapid transportation of a high-voltage cable, having a rotatable cable reel, which has a winding cylinder and side limits which are connected for conjoint rotation with the winding cylinder and protrude over the circumference thereof, a holding frame for rotatably mounting the cable reel, and a high-voltage cable, which is wound onto the cable reel.

A cable holder of this kind is known to a person skilled in the art from practical experience. Thus, high-voltage cables are usually mounted on cable holders that have a rotatable cable reel. The cable reel has a winding cylinder which is of circular-cylindrical configuration and extends between two side walls. In this case, the cable reel is rotatable about an axis of rotation which is generally aligned horizontally. To hold the cable reel horizontally, use is made of a holding frame that has two rotary bearings to accept journals extending on both sides of the cable reel.

A container arrangement for accepting a cable holder of this kind is described in WO 2017/186716 A1. The cable holder arranged in the containers is used to quickly put into operation an arrangement of single-phase power transformers on site, thus enabling a failed transformer to be replaced quickly in the event of a fault.

WO 2017/186748 A2 discloses a power transformer unit which can likewise be transported quickly and can be put into operation within a very short time on site. The power transformer unit comprises a plurality of single-phase power transformers. To enable the single-phase transformers to be set up and connected to one phase of a power supply network in a way which is as flexible as possible, an outdoor terminal that can be connected to the respective single-phase transformer via a cable connection is provided.

The cable holder mentioned at the outset is subject to the disadvantage that it does not allow long-term storage of the high-voltage cable for several years without having from time to time to unwind the high-voltage cable wound onto the cable reel.

SUMMARY OF THE INVENTION

It is therefore the object of the invention to provide a cable holder of the type stated at the outset which allows long-term holding and, at same time, rapid transportation of the high-voltage cable.

The invention achieves the object by virtue of the fact that the winding cylinder has a diameter of over 1300 mm.

According to the invention, the cable holder provided has a cable reel with a winding cylinder that has a larger diameter than conventional winding cylinders, with the result that the bending radius of the high-voltage cable wound onto the cable reel is so large that long-term storage is made possible and laborious unrolling of the high-voltage cable at predetermined time intervals is avoided. The cable holder according to the invention can therefore be stored with the wound high-voltage cable even over a long period of time.

In the context of the invention, the winding cylinder is of cylindrical design. In this case, the winding cylinder can be of circular-cylindrical design, for example. However, a polygonal cylinder shape is also possible in the context of the invention. In the case of a polygonal cylinder, the cross section thereof is polygonal, e.g. rectangular, hexagonal, octagonal etc. The winding cylinder is of hollow construction, for example, in order to save weight. In the case of a polygonal cylinder shape, the diameter in a cross-sectional view is the smallest distance between two points on an envelope.

The high-voltage cable is advantageously designed for operating voltages of between 70 kV and 160 kV and, in particular, of between 100 kV and 155 kV. High-voltage cables in this voltage range are suitable for applications in combination with power transformers in the power transmission sector. In this case, the high-voltage cable is used to connect single-phase transformers on the low-voltage side thereof, for example.

According to a preferred embodiment of the invention, a drive unit which is used to rotate the cable reel in both directions is provided. In general, the configuration of the cable reel is such that it takes up so much space that winding and unwinding the high-voltage cable onto and off the cable reel by hand is arduous. In order to simplify the winding process or even to make it possible at all, a drive unit is provided which, on the output side, produces a rotary motion, which is introduced into the cable reel via suitable power transmission means, thus enabling said reel to be rotated in both directions. In principle, the drive unit can be of any desired construction. Thus, in the context of the invention, an electric or hydraulic drive unit may be considered, for example.

According to a preferred variant of the invention, however, the drive device is a pneumatic drive unit. With the aid of a pneumatic drive device, the winding and unwinding process of the high-voltage cable can take place independently of the electric power supply. This enables universal use of the cable holders according to the invention without reference to the voltage sources available on site, which may vary in respect of their frequency or operating voltage. In the context of this further development, the compressed air is supplied by a compressor or by a compressed air system of a motor vehicle.

At one of its ends, the high-voltage cable advantageously has a cable termination with solid insulation, and a plug-in part of a high-voltage plug connection at its end remote from the cable termination. In other words, the high-voltage cable is prefabricated for the desired use. For this purpose, the high-voltage cable has the required terminals at both ends. The cable termination with solid insulation is used for connection to an outdoor terminal, which is described in WO 2017/186749 A1, for example. The outdoor terminal comprises a holding frame, which is designed to accept the cable termination with solid insulation. With the aid of the outdoor terminal, the cable termination can be set up at any desired point on site, thus allowing flexible and rapid connection to an air-insulated high-voltage conductor.

At an end remote from the cable termination, the high-voltage cable has a plug-in part, which is part of a high-voltage plug connection. In addition to the plug-in part, the high-voltage plug connection comprises an equipment connection part, which is embodied as a plug socket, for example. An equipment connection part of this kind is described by way of example in WO 2017/186751 A1. The plug socket described there has a fastening section, which is embodied as a flange, for example, by means of which the plug socket can be mounted in a fixed manner on a housing, e.g. that of a transformer. In order to fasten the plug socket on the housing in an airtight and liquidtight manner, sealing means are provided, these being clamped between the housing and the fastening section embodied as a flange. Each plug socket furthermore has a receiving section, which is composed of an electrically nonconductive material. In this case, the receiving section tapers toward a closed end. At the closed end, the wall of the receiving section is penetrated by a bolt-shaped contact part, which is electrically conductive and is produced from a metallic material, for example. On its side facing the interior of the housing, the contact part is connected to one winding of a transformer, for example, via a winding connection line. In this case, the receiving section is complimentary in shape to an insertion section of the plug-in part, and therefore there is accurately fitting contact between the two components, and air or other inclusions between these two components is/are avoided.

In the context of the invention, the cable holder advantageously comprises a termination holder for holding a cable termination in a horizontal position. For long-term storage, e.g. in a container, the dry-insulated termination is not held on the cable reel but is removed from the latter and placed in a termination holder designed specifically for the cable termination. The cable termination, which is of conical configuration for example, requires horizontally aligned mounting to enable damage due to long-term storage to be avoided. The cable termination advantageously has an outdoor terminal at its free end. Extending from this outdoor terminal is an elongated insulator, through which an insulator internal conductor connected to the outdoor terminal extends. The insulator internal conductor is connected to the internal conductor of the high-voltage cable.

The cable reel and the holding frame are advantageously produced from a metallic material, e.g. galvanized steel. Commercially available ball bearings are used to hold the cable reel on the holding frame. The cable reel is of course secured and fixed during the transportation of the cable holder, making a rotary motion impossible during transportation.

The winding cylinder is advantageously of circular-cylindrical design.

According to a preferred further development, the entire cable holder has a width of less than 2352 mm and a height of less than 2690 mm. According to this advantageous further development, it is possible to accommodate the cable holder according to the invention in a standardized 20 foot container. The cable reel, together with the possible termination holder, secured in the 20 foot container can be stored even over long periods of time and transported quickly to the respectively desired location of use when required.

The holding frame expediently has apertures for the insertion of respective prongs of a forklift truck. The holding frame provides the necessary mechanical strength to be able to rotatably mount the cable reel and the high-voltage cable in a secure way. In this case, the holding frame has a flat base, for example, in which the apertures for the forklift truck prongs are provided. Mutually opposite holding rails, which have the desired bearing to receive the cable reel, are provided on both sides of the base.

Further expedient embodiments and advantages of the invention are apparent from the subject matter of the following description of illustrative embodiments of the invention with reference to the figures of the drawing, wherein identical reference signs refer to components that act in the same way.

DETAILED DESCRIPTION OF THE INVENTION

Figure 1:
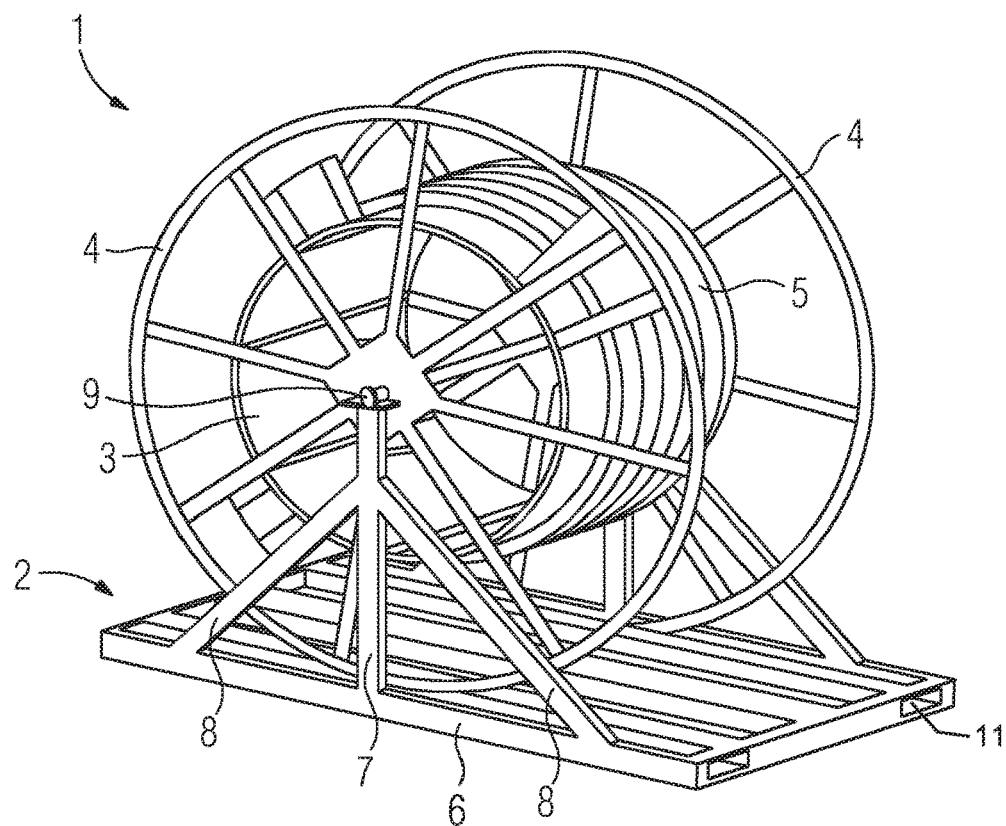
FIG. 1 illustrates an illustrative embodiment of the cable holder according to the invention in a perspective view.

FIG. 1 shows an illustrative embodiment of a cable holder 1 according to the invention, in accordance with the present invention. The cable holder 1 has a holding frame 2, a cable reel with a winding cylinder 3 and two side limits 4, which are arranged on both sides of the winding cylinder 3 and are connected firmly thereto. A high-voltage cable 5 is wound onto the winding cylinder 3. The holding frame 2 has a base 6 as well as a holding support 7 and two transverse reinforcements 8, which each extend between one corner of the base 6 and the holding support 7. The holding support 7 projects perpendicularly from the base 6 on one side of the latter in a central position. A rotary bearing 9 is arranged at its end remote from the base 6. The side limits 4, which are connected firmly to the hollow winding cylinder 3 of circular-cylindrical design, have a bearing pin, not illustrated in the figures, which engages in the rotary bearing 9 of the respective holding support and is held there in a rotatable manner by a ball bearing. In this way, the cable reel 3, 4 is rotatably mounted in the holding frame 2.

Figure 2:
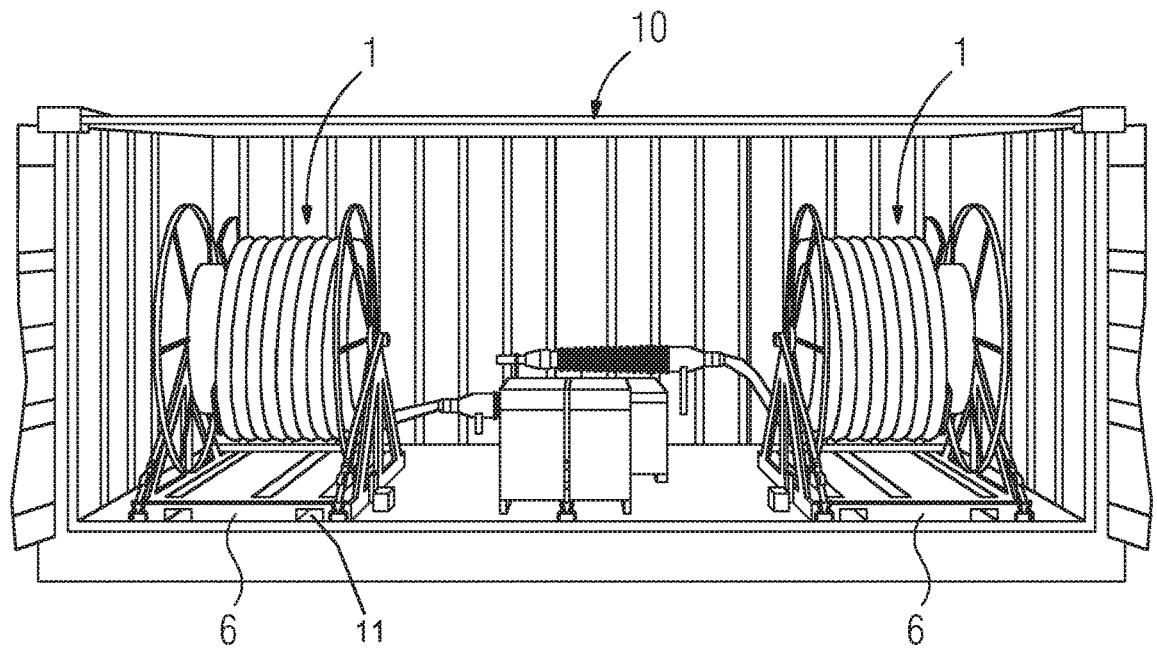
FIG. 2 illustrates two cable holders, accommodated in a container, in accordance with one illustrative embodiment of the invention.

FIG. 2 shows two cable holders 1 according to FIG. 1, which are arranged within a 20 foot container 10. The interior of the 20 foot container has a width of 2352 mm and a height of 2690 mm. It is evident that the cable holders 1 are of smaller configuration than these dimensions, wherein two apertures 11, which enable a prong of a forklift truck to be inserted, can be seen in the base 6 of each holding frame 2. With the aid of the forklift truck, the cable holders 1 can easily be inserted into the 20 foot container and removed therefrom.

Figure 3:
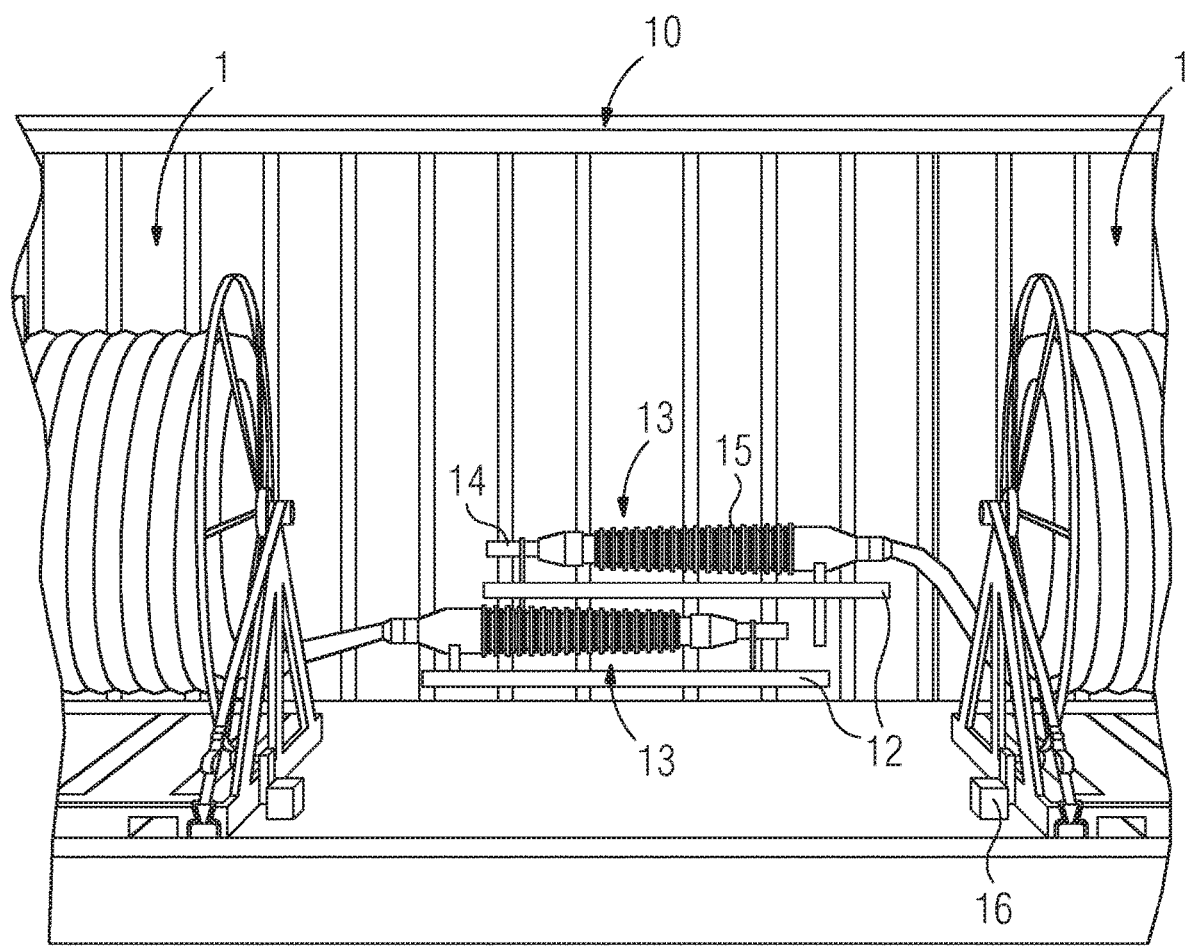
FIG. 3 illustrates two further illustrative embodiments of the cable holder according to the invention, including a termination holder within a container.

FIG. 3 shows a further illustrative embodiment of a cable holder 1 according to the invention. For this purpose, two cable holders 1 are placed in a 20 foot container 10. In this illustration, it is evident that each cable holder 1 has a terminal holder 12. The terminal holder 12 is firmly connected to a side wall of the container 10 and is used for the horizontal mounting of a cable termination 13 with solid insulation, which terminates the high-voltage cable 5 at one of the ends thereof. The cable termination 13 has an outdoor terminal 14, which projects at the free end from an insulator 15 of conical configuration and is provided for connection to an air-insulated high-voltage line. An internal conductor (not illustrated in the figures) connected in an electrically conducting fashion to the outdoor terminal 14 extends through the insulator 15. To avoid leakage currents, the insulator 15 is provided with ribs on the outside. The internal conductor of the insulator 15 is, in turn, connected to the internal conductor of the high-voltage cable 5, which is wound onto the cable reel 3, 4 of each cable holder 1.

To avoid having to impart rotation to the cable reel 3, 4 manually, a pneumatic drive device 16 that is connected in a fixed manner to the holding frame 2 is provided. The pneumatic drive device 16 can be connected to the compressed air system of a heavy goods vehicle, making the drive device 16 independent of the respective power supply available on site.

The cable reel 3, 4 of the cable holders 1 shown in FIGS. 1 to 3 has a horizontal axis of rotation, wherein the inside diameter of the circular-cylindrical winding cylinder 3 is 1500 mm. The high-voltage cable 5 can therefore also be held by the cable holder 1 even over long periods of time without the high-voltage cable 5 having to be unwound from the cable reel 3, 4 at fixed intervals. In this case, the cable holder 1 is of such compact design that storage of the cable holder 1 within a standardized 20 foot container is made possible. In this way, low-cost storage over long periods of time is made possible, while the container 10 with the cable holder 1 can be transported quickly to the desired destination when required.

The invention claimed is:

1. A cable holder for the long-term storage and the rapid transportation of high-voltage cables, the cable holder comprising:
    a rotatable cable reel including a winding cylinder and side limits connected for conjoint rotation with said winding cylinder, said winding cylinder having a circumference, said side limits protruding beyond said circumference of said winding cylinder, and said winding cylinder having a diameter exceeding 1300 mm;
    a holding frame rotatably mounting said cable reel; and
    a high-voltage cable rated for operating voltages of between 70 kV and 160 kV, said high-voltage cable wound onto said cable reel, said high-voltage cable having two ends, a cable termination with a solid insulator at one of said ends and a plug-in part of a high-voltage plug connection at the other of said ends, said cable termination having a free end and an outdoor terminal at said free end, and said solid insulator having an outside with ribs.

2. The cable holder according to claim 1, wherein said high-voltage cable is rated for operating voltages of between 100 kV and 155 kV.

3. The cable holder according to claim 1, which further comprises a drive device for rotating said cable reel in two directions.

4. The cable holder according to claim 3, wherein said drive device is a pneumatic drive device.

5. The cable holder according to claim 1, which further comprises a termination holder for holding said cable termination in a horizontal position.

6. The cable holder according to claim 1, wherein said winding cylinder has a circular-cylindrical shape.

7. The cable holder according to claim 1, wherein the cable holder has a width of less than 2352 mm and a height of less than 2690 mm.

8. The cable holder according to claim 1, wherein said holding frame has apertures for insertion of a prong of a forklift truck.

* * * * *